(12) United States Patent
Ariga et al.

(10) Patent No.: US 9,785,633 B2
(45) Date of Patent: Oct. 10, 2017

(54) FOREIGN LANGUAGE SERVICE ASSISTING APPARATUS, METHOD AND PROGRAM

(75) Inventors: Michiaki Ariga, Kawasaki (JP); Kazuo Sumita, Yokohama (JP); Masaru Suzuki, Kawasaki (JP); Hiroko Fujii, Komae (JP); Hiromi Wakaki, Tokyo (JP)

(73) Assignee: Kabushiki Kaisha Toshiba, Minato-ku, Tokyo (JP)

( * ) Notice: Subject to any disclaimer, the term of this patent is extended or adjusted under 35 U.S.C. 154(b) by 495 days.

(21) Appl. No.: 13/422,332

(22) Filed: Mar. 16, 2012

(65) Prior Publication Data
US 2012/0253782 A1 Oct. 4, 2012

(30) Foreign Application Priority Data
Mar. 28, 2011 (JP) .................................. 2011-070798

(51) Int. Cl.
*G06F 17/28* (2006.01)
(52) U.S. Cl.
CPC .................................. *G06F 17/289* (2013.01)
(58) Field of Classification Search
CPC .. G06F 17/2836; G06F 17/289; G06F 17/279; G06F 17/28; G06F 17/30985; G06F 17/30654; G06F 15/025; G06F 3/167; G06Q 20/20; G06Q 20/322; G06Q 20/325; G06Q 30/0641; G10L 15/26
See application file for complete search history.

(56) References Cited

U.S. PATENT DOCUMENTS

| 5,854,997 A | * | 12/1998 | Sukeda ............... G06F 17/2836 345/173 |
| 7,346,515 B2 | * | 3/2008 | Mizutani ................ G10L 15/22 704/2 |
| 2002/0120436 A1 | * | 8/2002 | Mizutani et al. ................. 704/2 |
| 2007/0100601 A1 | * | 5/2007 | Kimura ............................. 704/4 |

FOREIGN PATENT DOCUMENTS

| JP | 2002-323969 A | 11/2002 |
| JP | 2004-21937 A | 1/2004 |
| JP | 2008-243080 A | 10/2008 |
| JP | 2011-221891 A | 11/2011 |

OTHER PUBLICATIONS

Japanese Office Action (with English Translation) dated Dec. 11, 2012 from corresponding JP 2011-070798; 4 pages.

* cited by examiner

*Primary Examiner* — Angela A Armstrong
(74) *Attorney, Agent, or Firm* — Ohlandt, Greeley, Ruggiero & Perle, L.L.P.

(57) ABSTRACT

According to one embodiment, a foreign language service assisting apparatus is provided with first and second acquisition units, a translation unit, a presentation unit and an accepting unit. The first acquisition unit acquires first information on a first article. The second acquisition unit acquires second information on second articles associated with the first article, and subsequent speech candidates expected to be spoken, based on the first information. The translation unit translates the first information, the second information, and the candidates. The presentation unit presents translation result. The accepting unit accepts selection associated with the first or second articles or the candidate.

15 Claims, 14 Drawing Sheets

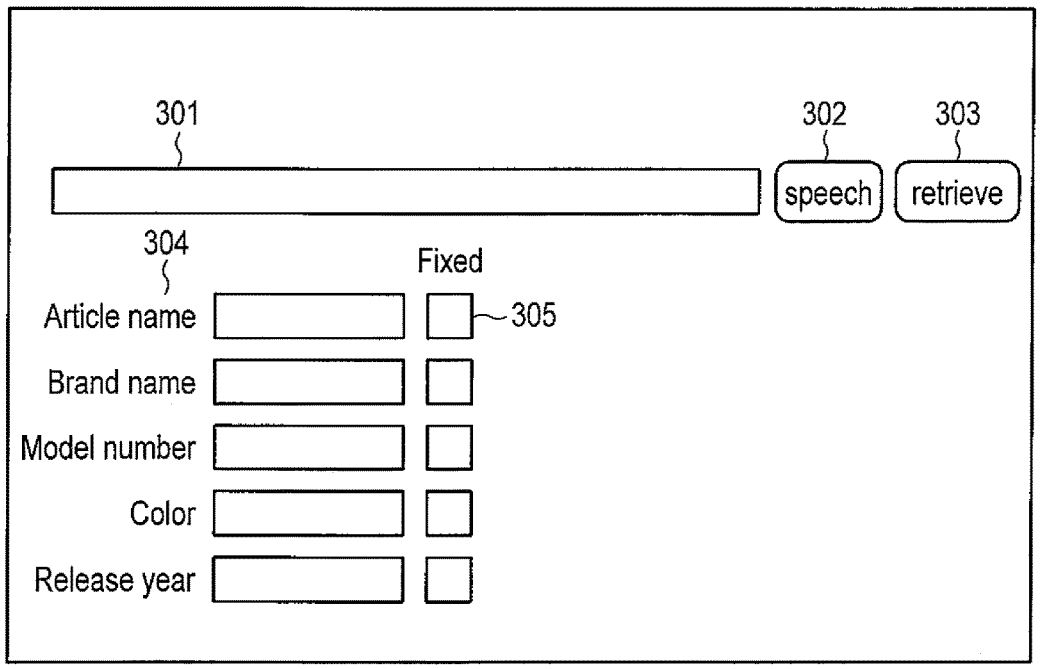
F I G. 5
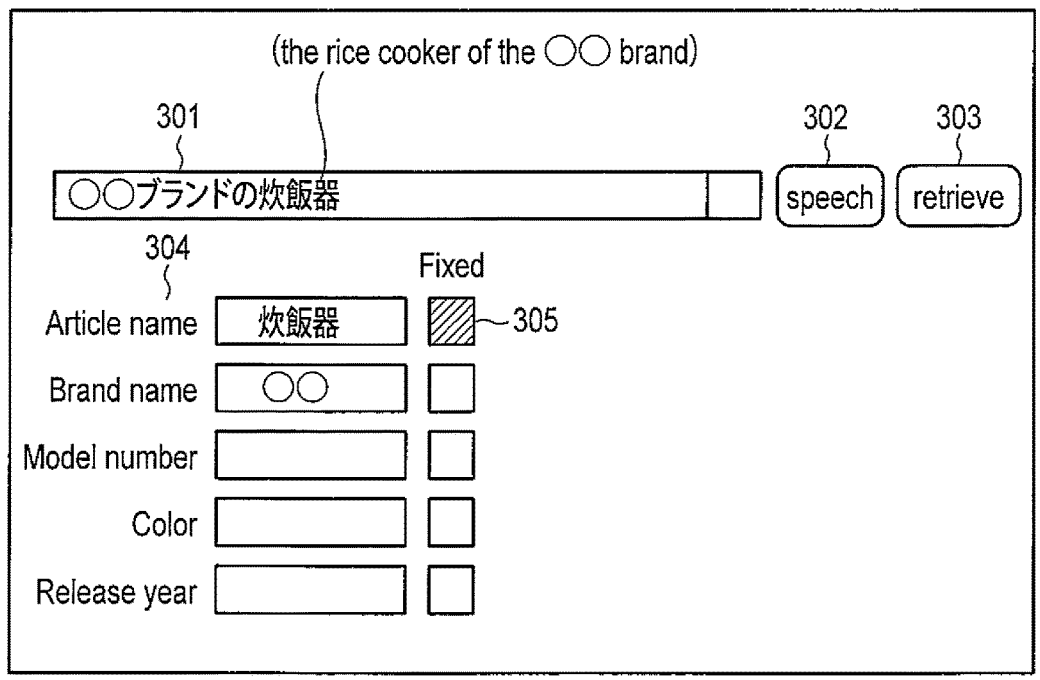
F I G. 6

| direction word | Meaning category |
|---|---|
| Silver | Color |
| Black | Color |
| Rice cooker | Article name |
| Microwave oven | Article name |
| ○○ | Brand name |
| □□ | Brand name |
| ×○ | Brand name |
| RC-10VV | Model number |
| RC-18VV | Model number |
| ~ | ~ |

| Model number | Article name | Brand name | Color | Release year |
|---|---|---|---|---|
| RC-10VV | Rice cooker | ○○ | Silver | 2010 |
| RC-10VVD | Rice cooker | ○○ | Silver | 2010 |
| AA-1E | Rice cooker | △△ | White | 2010 |
| VL-12D | Microwave oven | □□ | Black | 2010 |
|  |  | ~ |  |  |

| Article attribute category | Article attribute information |
|---|---|
| Color | Black, brown, white, silver, ... |
| Brand name | ○○, □□, △△, ... |
| Article name | Rice cooker, microwave oven, ... |
| ~ | ~ |

| Article attribute category | ID | Subsequent speech candidate | Frequency |
|---|---|---|---|
| Color | 00001<br>00002<br>~ | Any other brand?<br>Any recommended article? | 480<br>232 |
| Brand name | 10001<br>10002<br>~ | Another brand?<br>Color selectable? | 154<br>43 |
| Article name | 20003<br>~ | Any recommended article? | 219 |
F I G. 14
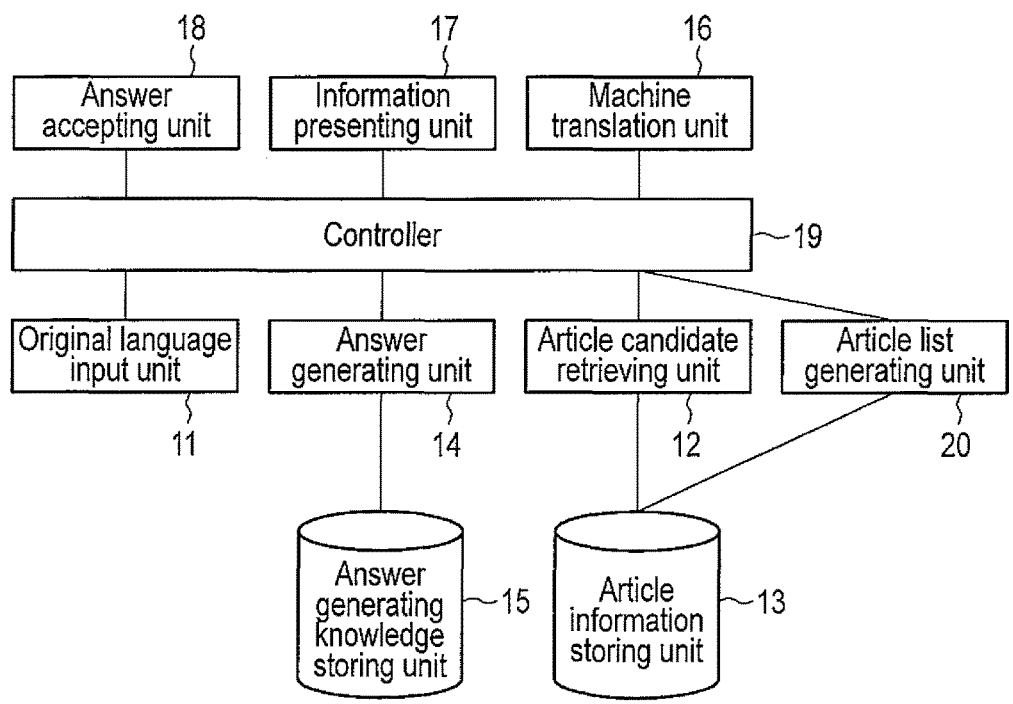
F I G. 15

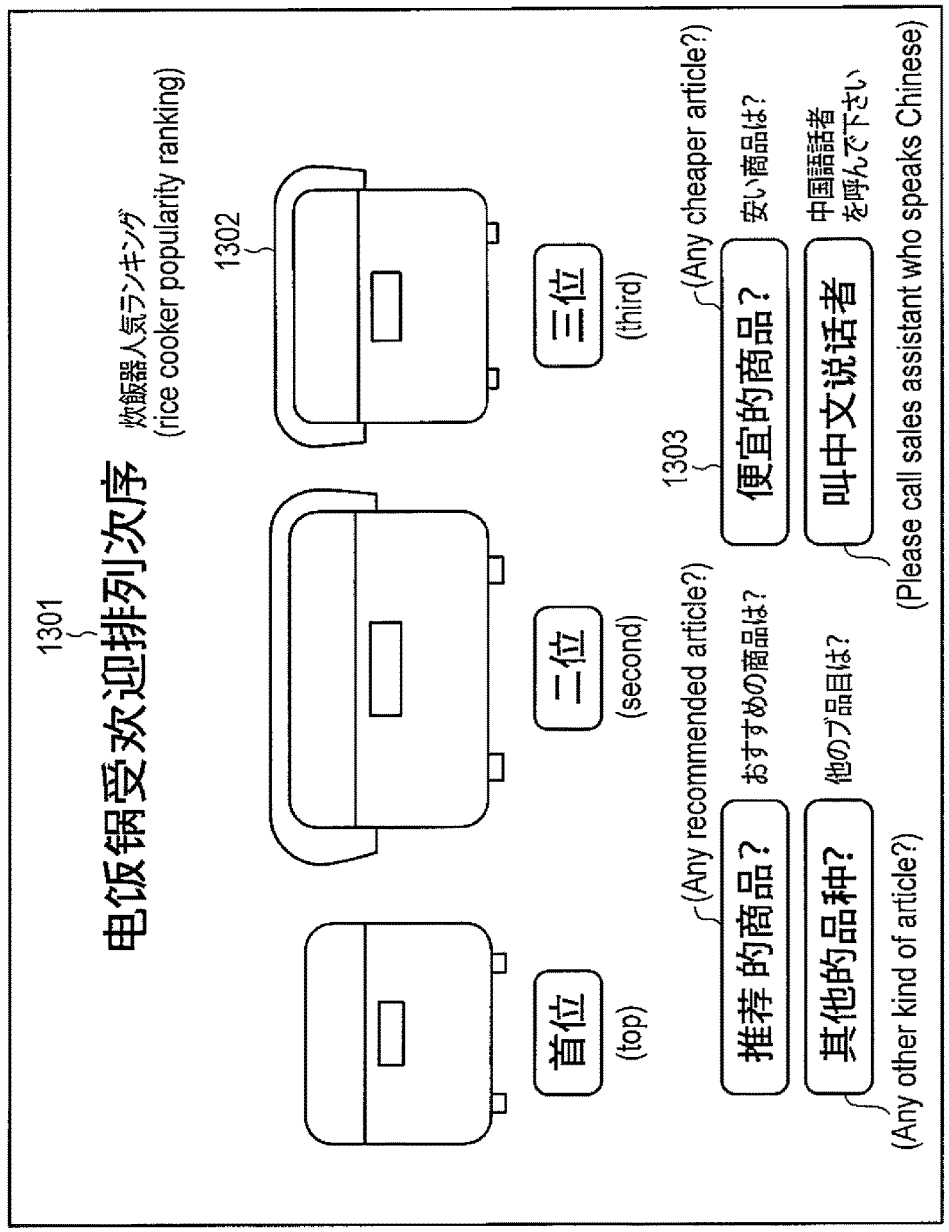
F I G. 16

FOREIGN LANGUAGE SERVICE ASSISTING APPARATUS, METHOD AND PROGRAM

CROSS-REFERENCE TO RELATED APPLICATIONS

This application is based upon and claims the benefit of priority from prior Japanese Patent Application No. 2011-070798, filed Mar. 28, 2011, the entire contents of which are incorporated herein by reference.

FIELD

Embodiments described herein relate generally to foreign language service assisting apparatuses, methods and programs for assisting services offered using different languages.

BACKGROUND

Tourists from foreign countries currently increase for the purpose of, for example, shopping. Tourists, who use foreign languages as their mother tongues, may often bring catalogues into stores to buy articles they want, using the catalogues. In this case, if the articles are unavailable, or if sales assistants want to recommend articles, it is important for the assistants to understand the requests of the tourists who speak foreign languages in order to offer satisfactory services.

As a system for assisting smooth sales activities, a sales assisting apparatus is known which, for example, extracts a keyword from the customer's voice information input thereto, converts the extracted keyword into a weight for an element (such as "price," "design" or "operability") associated with the keyword, and retrieves and presents article information based on the conversion result. Actually, however, it is difficult for customers unfamiliar to the system to input their voices thereto. In particular, if the customers speak foreign languages, it is significantly difficult for them to input their voices to the system.

Further, a conversation assisting apparatus for assisting a conversation between persons who speak different languages as their mother tongues is known, in which the speech of only one of the persons is translated into the corresponding speech expressed in the language of the other person, to thereby permit, for example, an option "Yes" or "No" or a map corresponding to the input speech to be presented, and to permit the other person to select or point the presented option or map, thus realizing assist of conversation utilizing the voice input of only one person. However, this prior art is disadvantageous, for example, in that conversation may be stopped after the selection of "Yes" or "No," or be stopped because, for example, a customer wishes to give an answer other than that presented by the system, but cannot express it. Thus, the customer cannot hold further or smooth conversation they wish. Furthermore, when the customer tries to designate an article or a condition for the article, the sales assistant may be often unable to understand the feature of the designated article and therefore unable to present the article.

Thus, there is no technique of sufficiently assisting conversations associated with services and held between a first person using a first language and a second person using a second language.

BRIEF DESCRIPTION OF THE DRAWINGS

FIG. 5 is a view illustrating an initial screen example of an article retrieval screen through which article retrieval is performed by inputting data spoken in an original language;

FIG. 6 is a view illustrating a display example of data input in the original language to the article retrieval screen;

FIG. 14 is a view illustrating an example of a subsequent speech candidate dictionary;

FIG. 15 is a block diagram illustrating a functional configuration example of a service assisting apparatus according to a second embodiment;

FIG. 16 is a view illustrating a presentation example of an article list;

DETAILED DESCRIPTION

Figure 1:
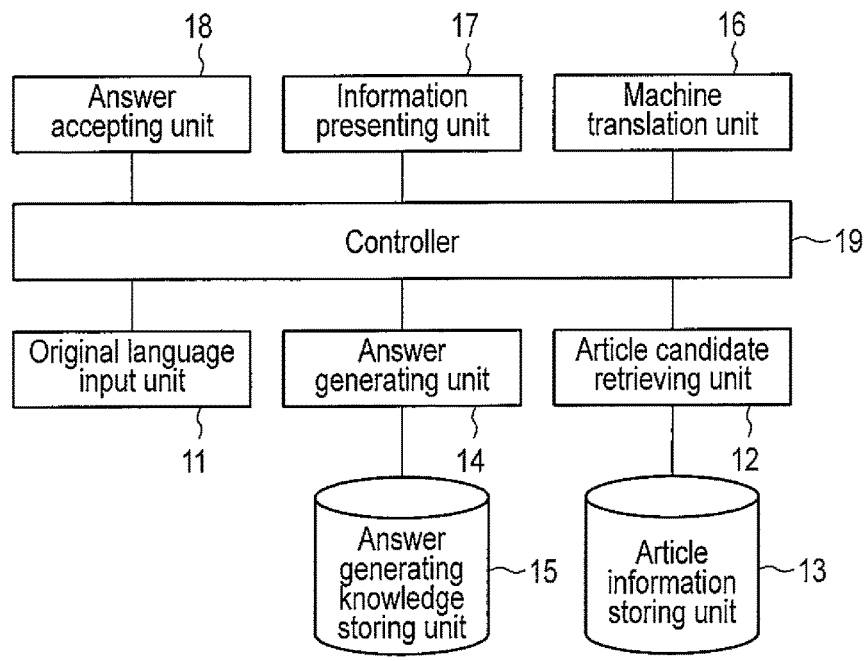
FIG. 1 is a block diagram illustrating a functional configuration example of a service assisting apparatus according to a first embodiment.

Foreign language service assisting apparatuses according to embodiments of the invention will be described in detail with reference to the accompanying drawings. In the embodiments, like reference numbers denote like elements, and duplicate descriptions will be avoided.

In general, according to one embodiment, there is provided a foreign language service assisting apparatus for assisting conversations held for services between a first user using a first language and a second user using a second language, comprising a first acquisition unit, a second acquisition unit, a translation unit, a presentation unit and an accepting unit. The first acquisition unit acquires first information on a first article serving as an initial candidate, the first information including a part written in the first language. The second acquisition unit acquires second information on at least one second article associated with the first article, and one or more subsequent speech candidates expected to be subsequently spoken by the second user, based on the first information and designated information on an article attribute of the first article, each of the second information and the one or more subsequent speech candidates including a part written in the first language. The translation unit translates, into the second language, the parts included in the first information, the second information, and the one or more subsequent speech candidates. The presentation unit presents at least the translated parts. The accepting unit accepts selection associated with the first article, selection associated with the second article, or selection associated with the subsequent speech candidate.

The embodiment can assist conversation associated with services offered between a first user who speaks a first language and a second user who speaks a second language.

A description will now be given of an example case where a first user (e.g., a sales assistant who offers services) of the foreign language service assisting apparatuses of the embodiments understands and speaks (for voice input) a first language (e.g., Japanese), and a second user (e.g., a customer to whom services are offered) understands a second language (e.g., Chinese) different from the first language.

In the embodiments below, the first user is a sales assistant of a store who sales articles, and the second user is a customer. Further, the services are sales services, and the articles are electronic devices. However, this case is just an example, and the embodiments are not limited to it, but also applicable to various communication services between different languages, such as communication made between different languages when other articles are sold, or communication made between different languages when services other than the sales of electronic devices or other articles are offered.

Further, in the embodiments below, the first language of the first user (also referred to as "a sales assistant") is Japanese, and the second language of the second user (also referred to as "a customer") is Chinese. However, it is a matter of course that the embodiments are not limited to it.

Yet further, it is assumed that if the first user is a sales assistant, they mainly operate the foreign language service assisting apparatuses. Accordingly, when the first user mainly operates the apparatus, it is desirable, for example, that the characters used on the display screen are characters of the first language (e.g., Japanese) other than the display portion on which characters of the second language are presented. However, the embodiments are not limited to this, but another language (e.g., English) may be used. Also, the data used in the foreign language service assisting apparatuses may be expressed in another language (e.g., English) other than the data that needs to be expressed in the first or second language.

In addition, in the examples described below referring to the drawings, a sales assistant who understands Japanese and does not understand Chinese is assumed. However, in the description and drawings below, for facilitating the understanding, a Japanese expression associated with the speech of the sales assistant, and a Chinese expression presented on the display screen, are accompanied by English expressions corresponding thereto. Regarding the explanations that may be expressed in a language other than the first or second language, English expressions will be used. Further, for the sake of convenience, regarding an example of a word-meaning category dictionary (FIG. 8), an example of data stored in an article information storing unit (FIG. 9), an example of an associated article attribute information dictionary (FIG. 13) and an example of a subsequent speech candidate dictionary (FIG. 14), English expressions will be used.

First Embodiment

In a first embodiment, it is assumed that the sales assistant as the first user performs, for example, article selection by the input of a voice of the first language, and an instruction operation using a pointing device, and that the customer performs selection between "candidates of predicted subsequent speeches (subsequent speech candidates)" or "associated articles" displayed in the second language, by an instruction operation using, for example, a pointing device.

In the first embodiment, regarding initial retrieval of articles supposed by a user, a description will be given of an example where article retrieval is performed by the input of data expressed in an original language (i.e., the first language used by the sales assistant).

FIG. 1 shows the functional configuration of the service assisting apparatus according to the first embodiment.

As shown in FIG. 1, the service assisting apparatus of the first embodiment comprises an original-language input unit 11, an article candidate retrieving unit 12, an article information storing unit 13, an answer generating unit 14, an answer generating knowledge storing unit 15, a machine translation unit 16, an information presenting unit 17, an answer accepting unit 18 and a controller 19.

The controller 19 controls the entire service assisting apparatus.

The article information storing unit 13 stores article information.

The answer generating knowledge storing unit 15 stores answer generating knowledge.

The original-language input unit 11 may input, using, for example, a microphone (and a voice recognition function), an original-language expression spoken in the first language by a user (this user is assumed to be the first user (i.e., the sales assistant)) and corresponding to a natural-language sentence or part of the natural-language sentence. As an input method for use in the original-language input unit 11, character input using, for example, a keyboard (and Japanese-letter/Chinese-character converting function), software keyboard input using a pen and/or a touch panel, handwriting character input, etc., can be utilized along with or instead of the voice input using the microphone.

The original-language input unit 11, which will be described later in detail, extracts a keyword (attribute information) as attribute information for articles from the input original-language expression, along with an attribute category, and outputs them along with the original-language expression.

The article candidate retrieval unit 12 extracts information necessary for article retrieval, based on the original-language expression input through the original-language input unit 11 (e.g., the original-language expression is converted into a single or a plurality of attributes for retrieval conditions). The article candidate retrieval unit 12 retrieves information on an article from the article information storing unit 13, using a retrieving mathematical expression based on the entire extracted information or part of the information (for example, selected by a user).

The answer generating unit 14 refers to the answer generating knowledge storing unit 15 to acquire a subsequent speech candidate or subsequent speech candidates (which are expected to be subsequently spoken by, for example, a second user (customer)), and an attribute condition or attribute conditions for an associated article candidate or candidates to be retrieved. The subsequent speech candidate(s) and the attribute condition(s) for the associated article candidate(s) are acquired using the first language.

As the attribute conditions for the associated article candidate(s), the answer generating unit 14 acquires, for example, a condition (a) that an article should have attribute information indicating "the same article name as that of a certain article," and attribute information indicating that the article has the same attribute information as that of the extracted attribute category, but be different from the certain article itself, and also acquires a condition (b) that an article should have attribute information indicating "the same article name as that of a certain article," and attribute information indicating that the article has attribute information different from that of the extracted attribute category. For instance, if the certain article is "a silver rice cooker C," the condition (a) is "a silver rice cooker other than the rice cooker C," and the condition (b) is "a rice cooker of a color other than silver." (Note: In this case, the certain article is "rice cooker C," the attribute information indicating the same article name as that of the certain article is "rice cooker," the extracted attribute category is "color," the attribute information of the extracted attribute category is "silver," and the attribute information different from that of the extracted attribute category is "color other than silver.")

In the above case, the article candidate retrieving unit 12 retrieves the articles corresponding to the respective conditions. For instance, the article that satisfies the condition (a), and the article that satisfies the condition (b), are retrieved. The thus retrieved articles are associated article candidates.

The thus-obtained subsequent speech candidate(s) and associated article candidate(s) are output as answer candidates.

The machine translation unit 16 translates, for example, into the second language, an original language (i.e., the first language) expression input via the original language input unit 11 (by, for example, a sales assistant), and article candidate information and subsequent speech candidate(s) expressed in the first language and output from the answer generating unit 14. Further, the machine translation unit 16, for example, translates, into the first language, a subsequent speech candidate or candidates (expressed in the second language) designated via the answer accepting unit 18 (e.g., selected by a customer and designated via the answer accepting unit 18 by a sales assistant or the customer themselves). Note that a machine translation function may be realized as, for example, a function of commercially available package software or a cellular phone application, but is not limited to it.

The information presenting unit 17 displays various types of information, such as speech information obtained by translation from the first language into the second language by the machine translating unit 16, article candidate information, and a subsequent speech candidate or candidates. The information presenting unit 17 may display first-language expressions corresponding to all or part of the expressions translated into the second language, along with the second-language expressions.

The information presenting unit 17 may be formed of a liquid crystal display, and be of a touch-panel type in which the answer accepting unit 18 accepts inputs made by, for example, a touch pen. However, the unit 17 is not limited to them. Further, the information presenting unit 17 may also utilize voice outputs of a loud speaker 206.

The answer accepting unit 18 is used by a user (e.g., the sales assistant or customer) to select an answer, to be presented to the other person, from the article candidate(s) or subsequent speech candidate(s) displayed on the screen.

The answer accepting unit 18 may be configured, for example, to enable a user (in this case, the first user or the sales assistant is assumed to be the user) to use the touch pen or their finger (and the touch panel), or another pointing device, such as a mouse, to thereby make a desired instruction on the display screen, so that the answer accepting unit 18 detects and accepts the instruction. In addition to this or in place of this, other input methods, such as voice input, key input and handwriting input, may be employed.

The service assisting apparatus of the embodiment may not have a network connecting function, or may have a wireless and/or wired network connecting function. Further, the service assisting apparatus may utilize a versatile computer, or be formed as a dedicated system. Yet further, the service assisting apparatus may be portable, or be of a fixed type.

If the service assisting apparatus has a network connecting function, both the article candidate retrieving unit 12 and the article information storing unit 13 may be incorporated in the main body of the service assisting apparatus. Alternatively, the article candidate retrieving unit 12 may be incorporated in the main body of the service assisting apparatus and the article information storing unit 13 may be provided on the network. Yet alternatively, both the article candidate retrieving unit 12 and the article information storing unit 13 may be provided on the network.

Figure 2:
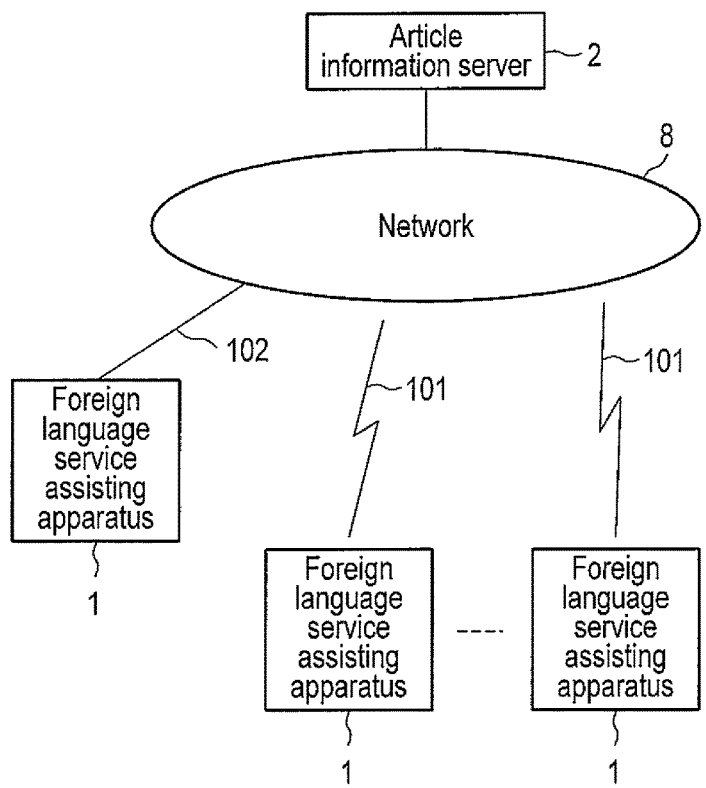
FIG. 2 is a network configuration example that includes an article information server.

Further, in the above case, an article information server 2 may be provided on a network 8 as shown in FIG. 2, such that it incorporates the article information storing unit 13, or both the article candidate retrieving unit 12 and the article information storing unit 13, and is shared between a plurality of foreign-language assisting apparatuses 1. In FIG. 2, reference number 102 denotes wired connection, and reference number 101 denotes wireless connection.

These points are applicable to the answer generating unit 14 and the answer generating knowledge storing unit 15, as well as the article candidate retrieving unit 12 and the article information storing unit 13.

Figure 3:
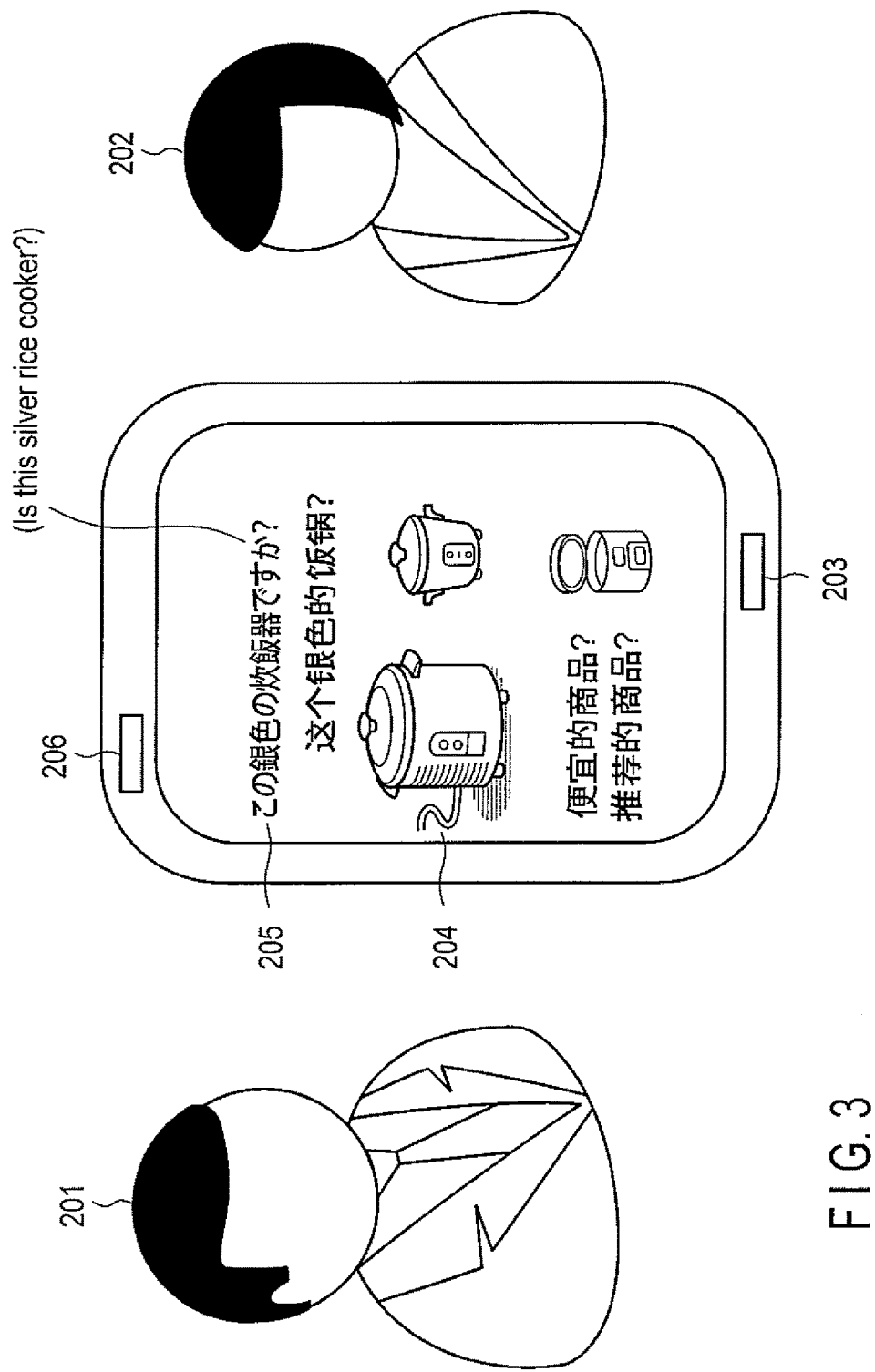
FIG. 3 is a view useful in explaining an example of an image of use.

FIG. 3 shows an example useful in explaining how to use the service assisting apparatus of the embodiment.

In the case of FIG. 3, a sales assistant 201 as the first user, who uses Japanese as the first language, and a customer 202 as the second user, who uses Chinese as the second language, utilize the service assisting apparatus. More specifically, the sales assistant 201 operates the service assisting apparatus for communication by, for example, inputting information on an article with voice though a microphone 203 (original-language input unit 11), or selecting an article presented on a display screen 205 (information presenting unit 17), using a pen 204 (answer accepting unit 18). On the other hand, the customer 202 operates the service assisting apparatus by, for example, selecting an answer candidate, such as an article candidate or subsequent speech candidate, using the pen 204. (FIG. 3 is a schematic view for explaining the outline of the operation, and examples of specific operations and presented data will be described later in detail.) The translation result may be displayed on the display screen 205 and output through a loud speaker 206. It should be noted that the device configuration is just an example, and may be modified as aforementioned. Namely, the input by the sales assistant is not limited to that through the microphone, but may be a handwriting input using a pen. Further, various input and output methods can be utilized.

Figure 4:
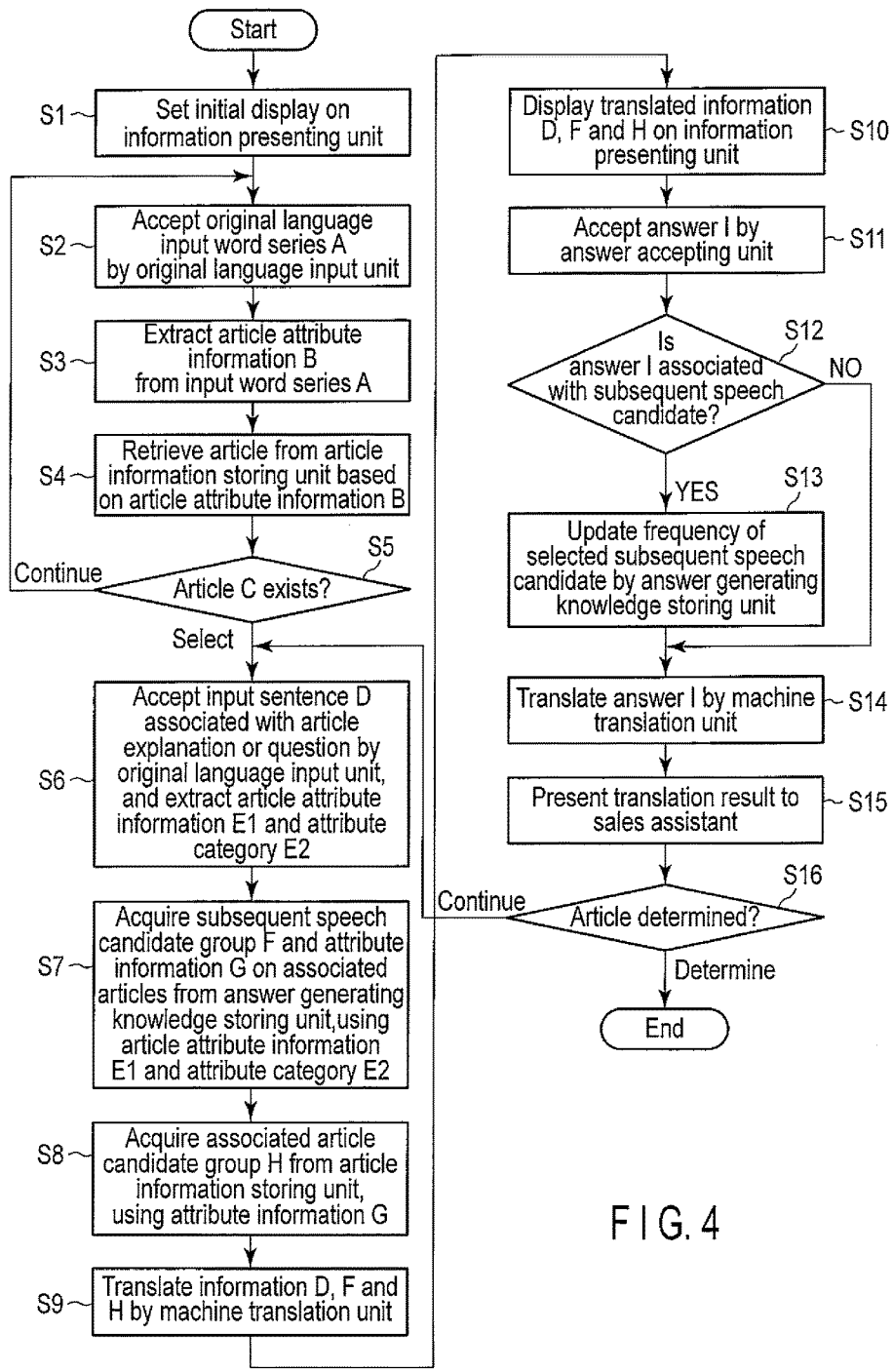
FIG. 4 is a flowchart illustrating a procedure example of the service assisting apparatus according to the first embodiment.

FIG. 4 is a flowchart useful in explaining a procedure example employed in (the controller 19 of) the service assisting apparatus of the first embodiment.

For example, assume here that the customer has pointed a desired article (hereinafter referred to as "the article C") presented on an article catalog that shows article pictures and their explanations written in the second language. For facilitating the description of this example, assume that the article C is a silver rice cooker of a certain brand.

At step S1 of FIG. 4, the information presenting unit 17 displays an initial screen image on the display screen (denoted by reference number 205 in FIG. 3) of the service assisting apparatus. In FIG. 3, the sentence denoted by reference number 205 and written in the first language (Japanese) means "Is this silver rice cooker?"

FIG. 5 shows an example of the initial screen image for retrieving an article though language input. The initial screen image shown in FIG. 5 comprises an original-language input result 301, a speech button 302 for voice recognition, a retrieving button 303 for article retrieval, conditions 304 obtained by converting the original-language input result into various attributes as retrieving conditions, and fields 305 for designating settlement of the respective conditions. Although FIG. 5 illustrates, by example, "article name," "brand name," "model number," "color" and "release year" as attribute information 304, the attribute information is not limited to them.

At step S2, the sales assistant inputs, to the original-language input unit 11 using an original language (e.g., Japanese), the whole or part (an input word series A) of a natural Japanese sentence that is associated with the article C designated by the customer and includes the model number and/or brand name thereof. The original-language input unit 11 accepts the input word series A.

For instance, in the initial screen image of FIG. 5, the sales assistant presses the speech button 302 and pronounces Japanese words meaning a rice cooker of a particular brand name. Thus, voice input is performed, whereby a voice recognition result corresponding to the rice cooker of the particular brand name spoken in Japanese is acquired. The voice recognition result (e.g., the rice cooker of the ○○ brand) is displayed as an input result 301, as shown in FIG. 6.

At step S3, the article candidate retrieving unit 12 extracts, from the input word series A (Japanese words), the article name (meaning the rice cooker) and the brand name as attribute information B.

Figures 7, 8, 9:
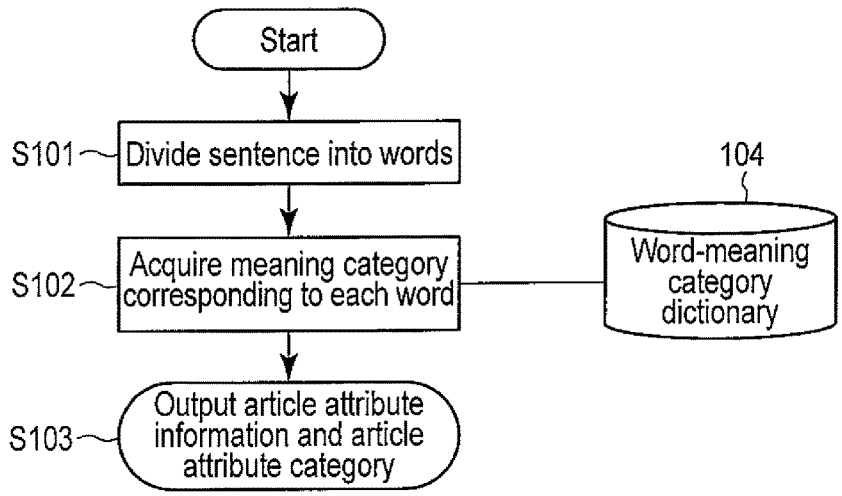
FIG. 7 is a flowchart illustrating a procedure example for obtaining article attribute information and an article attribute category.
FIG. 8 is a view illustrating an example of a word-meaning category dictionary.
FIG. 9 is a view illustrating an example of data stored in an article information storing unit.

FIG. 7 shows an example of a processing procedure for obtaining article attribute information and an article attribute category. The process may be performed by the article candidate retrieving unit 12 or the original-language input unit 11.

The article attribute information and article attribute categories stored in the article information storing unit 13 are beforehand registered in a word-meaning category dictionary 104 incorporated in the article information storing unit 13. FIG. 8 shows the word-meaning category dictionary 104. In this example, each entry includes an direction word corresponding to the attribute information and a meaning category corresponding to the attribute category.

At step S101, the input sentence is divided into a number of words. For instance, the Japanese input word series A meaning a rice cooker of a particular brand is divided into Japanese words meaning "a rice cooker," "of" and "a particular brand." For this process, a process generally called morpheme analysis is utilized.

At step S102, the word-meaning category dictionary 104 is referred to, thereby obtaining meaning categories corresponding to the respective words of the word series. For instance, from the "Japanese input word series A" meaning the rice cooker of the particular brand, a meaning category of 'brand name' (i.e., the attribute category of the article) corresponding to "a particular brand (e.g., ○○ brand)," and a meaning category of 'article name' corresponding to the Japanese words meaning the rice cooker, are acquired, referring to the dictionary shown in FIG. 8.

Further, from a Japanese words input (meaning that "Is this silver rice cooker?"), meaning categories of 'color' and 'article name' are acquired, for example.

At step S103, the acquired article attribute categories, and the words (Japanese words), to which the attribute categories are imparted, are output as article attribute information. In the example of the Japanese input word series A meaning the rice cooker of the particular brand, attribute information on the Japanese words meaning the certain brand and belonging to such an attribute category as 'brand name,' and attribute information on the Japanese words meaning the rice cooker and belonging to such an attribute category as 'article name', are output. In this example, the Japanese words meaning the certain brand and the rice cooker are set as the attribute information B.

Further, concerning, for instance, a Japanese input sentence (この銀色の炊飯器ですか？) meaning that "Is this silver rice cooker?," attribute information on the Japanese word (銀色) meaning silver and belonging to such an attribute category as 'color,' and attribute information on the Japanese words (炊飯器) meaning the rice cooker and belonging to such an attribute category as 'article name,' are output (in this case, the Japanese words meaning silver and the rice cooker are set as the attribute information B).

In the example of FIG. 6, the attribute information B is displayed in a corresponding entry field associated with the article attribute information 304. Specifically, FIG. 6 shows a Japanese article name (炊飯器) meaning the rice cooker and a Japanese brand name (○○) meaning the certain brand, which are acquired from the Japanese input word series A (○○ ブランド の炊飯器) meaning the rice cooker of the certain brand.

At step S4, regarding the Japanese input word series A meaning the rice cooker of the particular brand, the article candidate retrieving unit 12 retrieves an article satisfying the condition from the article information storing unit 13, based on the attribute information B (i.e., the Japanese words meaning the certain brand and the rice cooker).

For instance, in response to the Japanese input (この銀色の炊飯器ですか？) meaning that "Is this silver rice cooker?," article retrieval is performed based on the Japanese words meaning silver and the rice cooker.

FIG. 9 shows examples of data items stored in the article information storing unit 13. The examples in FIG. 9 comprise article attribute categories such as "model number," "article name," "brand name," "color" and "release year." As these category entries, specific article attribute information items are registered.

The article candidate retrieving unit 12 performs article retrieval by accessing the above database for query utilizing a method of, for example, SQL or XQuery.

In the display example of FIG. 6, the user can determine data included in the displayed attribute information 304 and used for retrieval, by, for example, checking a corresponding field 305. For instance, when the attribute information 304 includes "炊飯器 (Japanese words)" as the article name meaning the rice cooker, and " ○○ (certain Japanese words)" as the brand name meaning the certain brand, if it is evident from a catalog presented by a customer that the article name of the article C is "炊飯器" meaning the rice cooker, the article name can be determined as fixed information by selecting a fixing field 305.

Further, for example, in an article information example shown in FIG. 9, if retrieval is performed using the article name "炊飯器" meaning the rice cooker, such article information items as model numbers "RC-10VV," "RC-18VVD" and "AA-1E" are acquired.

The article retrieval result obtained at step S4 may be displayed on a display screen. Further, any method may be employed as a display method or an output method other than display.

At step S5, the sales assistant may browse the displayed article retrieval result (not shown), and may select the article C designated by the customer if the article C is included in the article retrieval result (for example, if the rice cooker with the above-mentioned model number "RC-10VV" is the article C).

Figure 10:
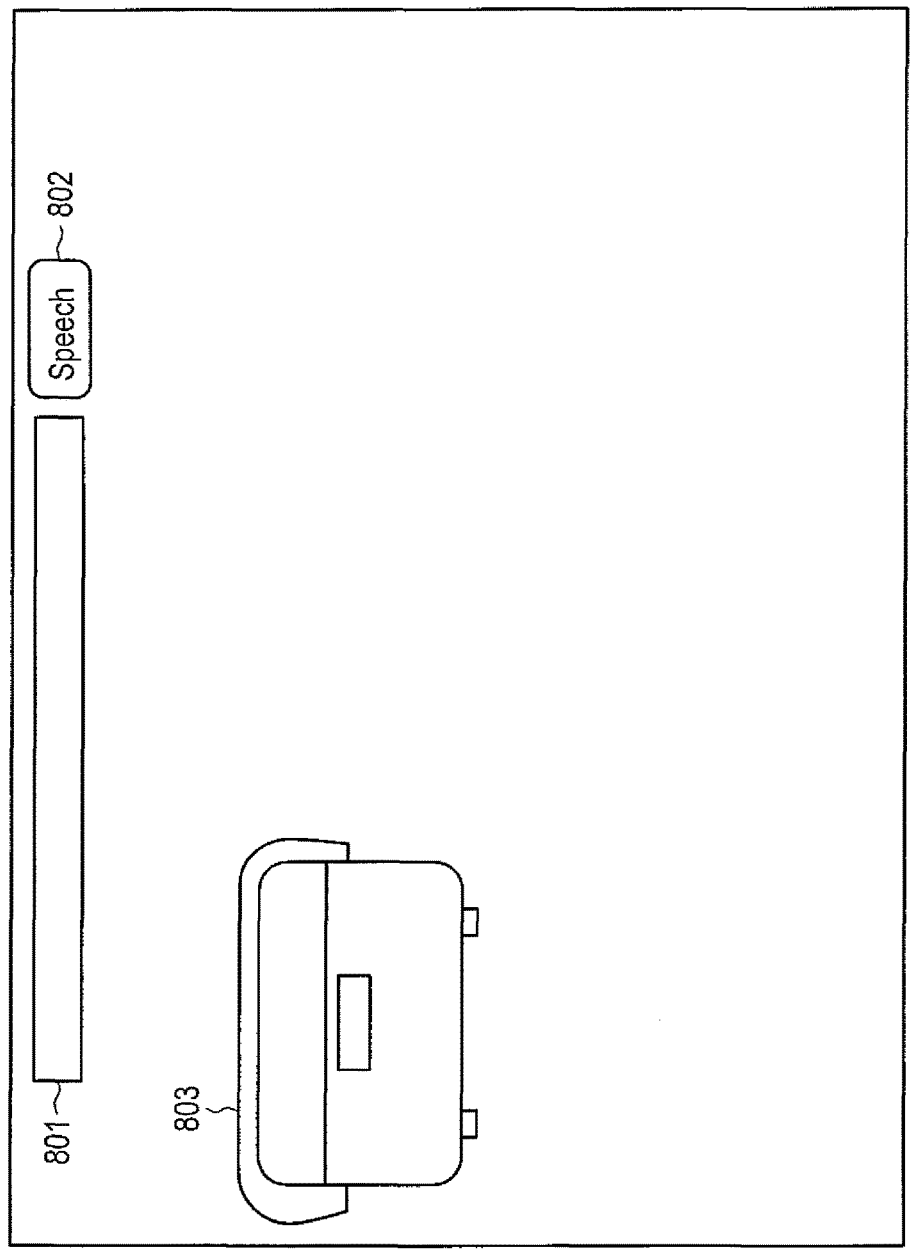
FIG. 10 is a view illustrating a display example of an information presenting screen, displaying article C.
Figure 11:
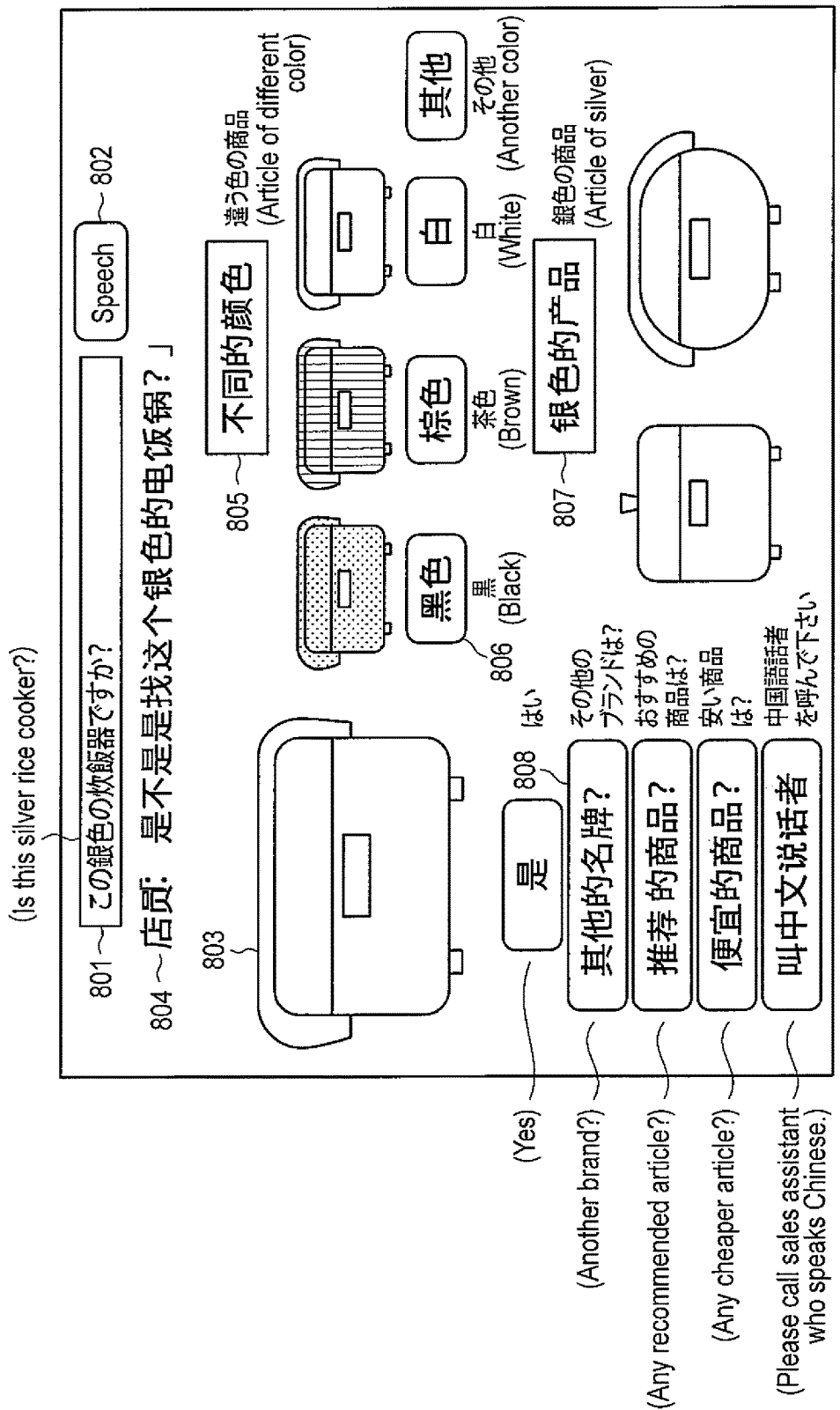
FIG. 11 is a view illustrating a display example of an information presenting screen, displaying the article C, an article associated therewith and a candidate for a subsequent speech.

Upon selecting the article C, the content of the display screen (information presenting screen) is updated to, for example, that for customer service, so that the selected article C (803) as the initial candidate is displayed as shown in, for example, FIG. 10. In FIG. 10, reference numbers 801 and 802 denote fields similar to those for the original-language input result 301 and the speech button 302 for voice recognition shown in FIG. 5. FIG. 10 shows a state of the screen in which the first user basically uses the screen, and FIG. 11 shows another state of the screen which is presented to the second user, as will be description later. However, the invention is not limited to this way of use.

If the article C exists, the process proceeds to step S6.

In contrast, if no article C exists, the process returns to step S2.

If the article C is selected at step S5, the sales assistant inputs, for example, a question or an explanation as an original language expression (input sentence D) by voice input, and the original-language input unit 11 accepts the input (step S6).

For instance, assume here that the sales assistant selects the article C as that designated by the customer in the above-mentioned retrieval result (not shown), and that the sales assistant presses the speech button 802 with the article C (803) displayed in the display example of FIG. 10, thereby inputting a question in Japanese meaning that "Is this silver rice cooker?" The input question is displayed in a question input field (801). In addition, as shown in FIG. 11, the speech "この銀色の炊飯器ですか？" of the sales assistant using the first language (Japanese), which means "Is this silver rice cooker?," may be translated into the second language (in this case, Chinese) and displayed as indicated, for example, by reference number 804.

The article candidate retrieving unit 12 (or the original-language input unit 11) extracts, from the Japanese input sentence D "この銀色の炊飯器ですか？" (meaning "Is this silver rice cooker?"), article attribute information E1 "銀色" (meaning silver), and an attribute category E2 of 'color.' In this specific example, since the article name "炊飯器" (meaning the rice cooker) is already determined at step S4, it is not used in the later process.

At step S7, based on the attribute information E1 and the attribute category E2 extracted the input sentence D, the answer generating unit 14 acquires, from the subsequent-candidate dictionary, a subsequent speech candidate 808 (hereinafter, "subsequent speech F") expected to be spoken by the customer, and attribute information 806 (hereinafter, "attribute information G") related to an attribute category E2 other than the attribute information E1. In this case, the attribute information G indicates 'color' other than 'silver', such as 'black,' 'brown' or 'white'.

Figures 12, 13:
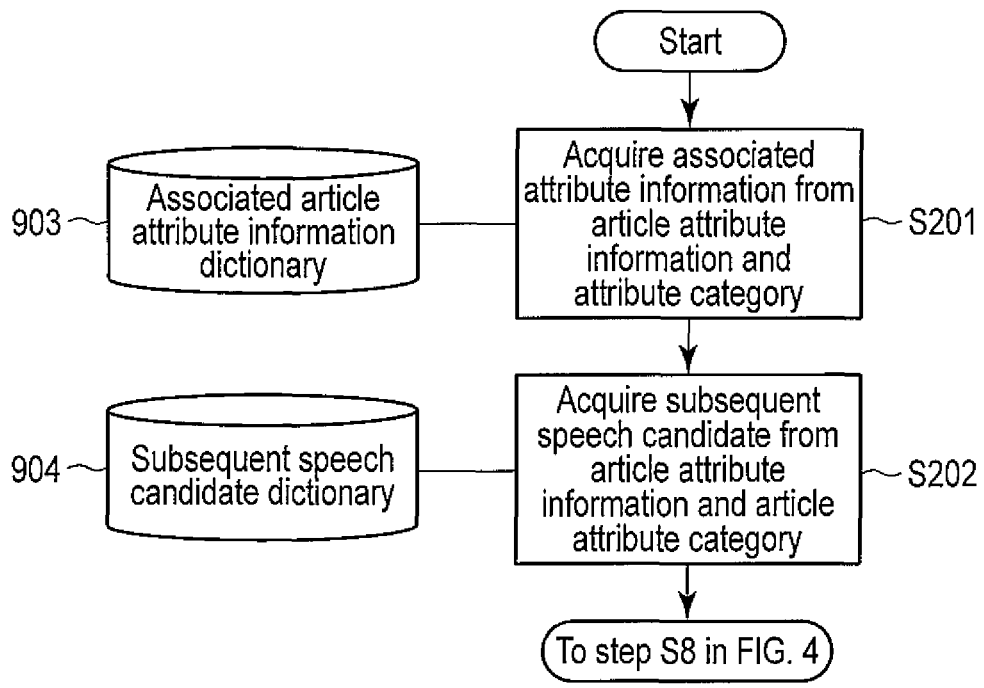
FIG. 12 is a flowchart illustrating a detailed procedure example of step S7 of FIG. 4.
FIG. 13 is a view illustrating an example of an associated article attribute information dictionary.

FIG. 12 shows an example of step S7 in detail.

FIG. 13 shows an example of an associated-article attribute information dictionary 903. In this example, each entry includes a set of "attribute information category" as a meaning category acquired from the attribute information of an article, and a single or a plurality of "article attribute information items" corresponding to the "attribute information category."

FIG. 14 shows an example of a subsequent speech candidate dictionary 904. In this example, each entry includes a set of "attribute information category," "ID" assigned to a subsequent speech candidate, "subsequent candidate" and "frequency."

At step S201, using the attribute category E2 of 'color' and the article attribute information E1 of 'silver' obtained at step S6, attribute information indicating a color other than silver, e.g., black, brown or white, is acquired as associated article information in the answer generating knowledge storing unit 15 from the associated-article attribute information dictionary 903.

For instance, by comparing the article attribute information of 'silver' obtained at step S6 with the article attribute information of 'black,' 'brown,' 'white,' 'silver,' etc., obtained from the associated-article attribute information dictionary 903, other attribute information G, such as 'black,' 'brown' and 'white,' belonging to the same attribute category of 'color,' can be acquired.

At step S202, a subsequent speech candidate is acquired from the subsequent speech candidate dictionary 904, using the article attribute category E2.

If, for example, an attribute category of 'color' is input, subsequent Japanese speech candidates, such as Japanese words meaning "other brand?" and "any recommended article?," are output as answer candidates, along with their respective IDs "0001" and "0002" and their respective selection frequencies "480 (times)" and "232 (times)."

At step S8, the articles associated with the article C are narrowed down in the article information storing unit 13, using the attribute information E1 and the attribute information G, thereby acquiring article candidate groups H corresponding to the respective attribute information items.

For instance, since at step 4, the article name "炊飯器 (meaning the rice cooker)" is fixed from the attribute information, an article group different in attribute category of 'color,' and another group of 'silver' articles, are acquired based on the attribute information E1 of 'silver' and the attribute category E2 that are expected by the sales assistant to be important to the customer.

In the example of FIG. 11, another information associated with the attribute category E2 is retrieved, and part or all of the retrieval result is displayed in the field denoted by reference number 805 at step S10, described later (for example, a rice cooker of a color other than silver, or rice cookers of colors other than silver, are displayed regardless of the brand "○○"). Further, the same attribute information as the attribute information E1, and article information corresponding thereto, are retrieved, and part or all of the retrieval result is displayed in the field denoted by reference number 807 (for example, a silver rice cooker or silver rice cookers other than the article C are displayed regardless of the brand "○○").

If the brand is fixed at "○○," a rice cooker of the brand "○○" and a color other than silver is displayed in the field 805, and a silver rice cooker of the brand "○○" other than the article C is displayed in the field 807.

At step S9, the machine translation unit 16 translates information including the input sentence D, a subsequent speech candidate group F and an article candidate group H into corresponding information of the second language.

In the example of FIG. 11, for example, the input sentence D "この銀色の炊飯器ですか？" (meaning that "Is this silver rice cooker?") is translated into the following Chinese sentence:

"是不是找这个 银色的电饭锅？"

Further, the following subsequent sentences F:

"その他のブランドは？" (meaning "any other brands?")

"おすすめの商品は？" (meaning "any recommended article?")

"安い商品は？" (meaning "cheaper article?")

"中国語話者 を呼んで下さい" (meaning "please call who can speak Chinese")

These sentences are translated as follows (see 808 in FIG. 11):

"其他的名牌？"

"推荐的商品？"

"便宜的商品？"

"叫中文说话者"

Furthermore, the following items included in the article candidate group H:

"違う色の商品" (meaning "an article of a different color")

"銀色の商品" (meaning "an article of silver")

These phrases are translated as follows (see 805 and 807 in FIG. 11):

"不同的颜色"

"银色的产品"

At step S10, the information presenting unit 17 displays the translation result, article image data, etc. on its display screen.

The subsequent speech candidate group F is sorted based on the frequency data acquired from the subsequent speech candidate dictionary 904.

Further, buttons 806 may be provided, which display words of the second language corresponding to the items of the attribute information G, "another color" and the like of the first language, for example.

At step S11, the answer accepting unit 18 accepts the answer I selected by the customer from the answer candidates.

If the customer selects a subsequent speech candidate as the answer candidate (Yes at step S12), the values of the "frequencies" in the subsequent speech candidate dictionary 904 shown in FIG. 14 are updated.

At step S14, if the answer I is associated with articles, the machine translation unit 16 translates the article information, and if it is associated with the subsequent speech candidate, the machine translation unit 16 translates the corresponding expression.

At step S15, the information presenting unit 17 presents the translation result on its display screen.

If it is determined at step S16 that the answer I selected at step S11 does not concern article determination, the program is returned to step S6, where the processing can be continued.

If the answer I concerns the article determination, the processing may be terminated.

At step S14, the information of the first language itself may be held, instead of translation thereof.

Further, on the display screen, presentation may be performed using both the first and second languages, or using only the second language, or by appropriately changing the way of use of these languages.

In addition to the above, certain information for the sales assistant may be presented using only the first language.

The service assisting apparatus of the first embodiment can assist conversation associated with services offered by the first user using the first language to the second user using the second language. For instance, by combining the article attribute information extracted from the speech of the first user with the article information selected by the first or second user, the first user can understand candidates and/or attribute information associated with the article requested by the second user, and presents associated article candidates to enable the second user to designate one or more of the candidates. As a result, satisfactory and smooth services can be realized. Further, where a sales assistant and a customer have different mother tongues, the former can grasp a specific request of the latter even if the former asks the latter a question that may result in an unsatisfactory answer, by not only translating explanations and/or questions of the sales assistant, but also combining the explanations and/or questions with articles selected by the customer to thereby anticipate the answer of the customer, and to present candidates so as to enable the customer to select one of them. Thus, the service assisting apparatus of the first embodiment can provide various advantages.

Second Embodiment

Referring now to FIGS. 15 to 18, a second embodiment will be described. In the second embodiment, the elements different from those of the first embodiment will be mainly described.

The second embodiment differs from the first embodiment in the way of display of articles in an initial stage.

FIG. 15 shows a functional configuration example of a service assisting apparatus according to the second embodiment. This configuration example is obtained by adding an article list generating unit 20 to the configuration example of the first embodiment shown in FIG. 1.

The article list generating unit 20 presents a list of articles prepared by a sales assistant based on a certain standard.

The second embodiment differs from the first embodiment in that the former includes the article list generating unit 20.

Figure 17:
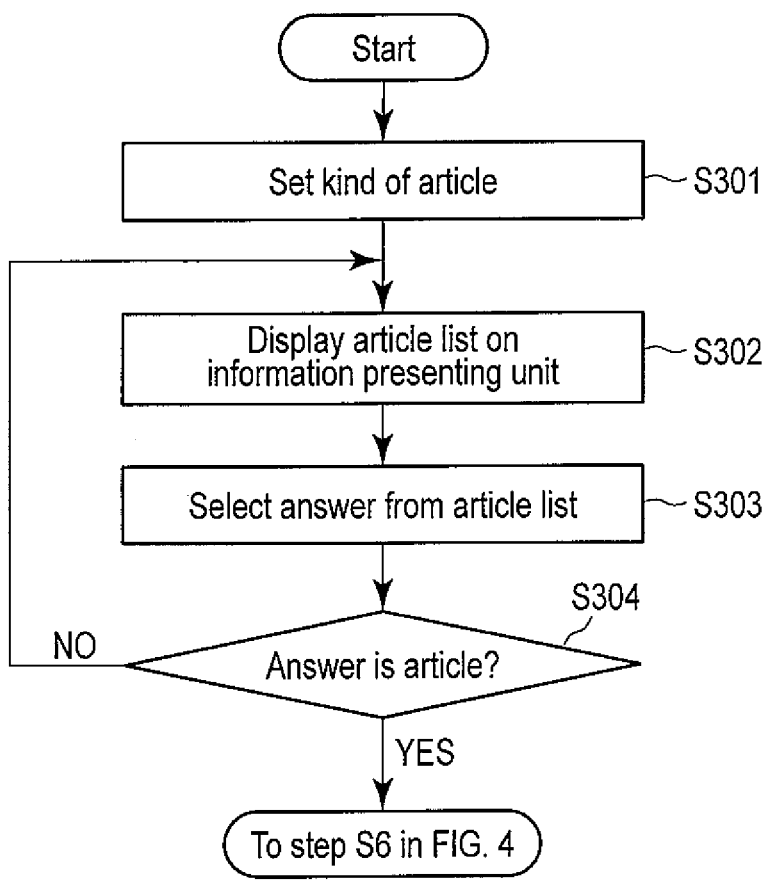
FIG. 17 is a flowchart illustrating a procedure example of the service assisting apparatus according to the second embodiment.

FIG. 17 is a flowchart useful in explaining a procedure example of the service assisting apparatus according to the second embodiment.

At step S301, the kind of article expected to be requested by the customer is set. For this setting, various methods can be employed. For example, the kind of article corresponding to a sales floor is set by detecting the sales floor using positioning means such as a GPS. In this case, a list of the articles may be presented in a particular field (indicated by, for example, reference number 205 in FIG. 3) on the display screen of the service assisting apparatus.

At step S302, the article list generating unit 20 shown in FIG. 16 presents an example of a screen output. Namely, a list of articles belonging to one category (e.g., a category of rice cookers) is beforehand created by the sales assistant from the data stored in the article information storing unit 13, based on a certain standard established in consideration of the popularity of each article or the articles to promote to sale.

In the display example of FIG. 16, a display area 1301 displays the title of the list as follows:

"电饭锅受欢 迎排列次序 炊飯器人気ランキング"

The left Chinese words and the right Japanese words both mean "rice cooker popularity ranking."

Further, a display area 1302 displays a list of articles selected based on the standard, and selection buttons for the articles, and a display area 1303 displays subsequent speech candidates for the customer.

At step S303, the customer or the sale assistant selects an answer from the screen of FIG. 16.

As step S304, if it is determined that the selected answer concerns an article, the processing is terminated, while if it is determined that the selected answer concerns no article, the process returns to step S302. After that, the process proceeds to step S6 of FIG. 4.

For instance, assume here that the customer has selected the following option from the screen:

"推荐的商品? おすすめの商品は?"

The left words are Chinese, and the right words are Japanese, both meaning that "Any recommended article?"

Subsequently, the sales assistant presses the "二位" (meaning "Second") button included in the three buttons "首位" (meaning "Top"), "二位" (meaning "Second") and "三位" (meaning "Third"). The display state assumed when the "二位" ("Second") button is pressed is similar to, for example, that of FIG. 10. In this state, if the speech button 802 shown in FIG. 10 is pressed to pronounce a Japanese sentence "こちらの○○ ブランドの炊飯器がお勧めです" meaning that this rice cooker of the ○○ brand is recommendable (see 801 in FIG. 18), article display is performed as shown in FIG. 18.

Figure 18:
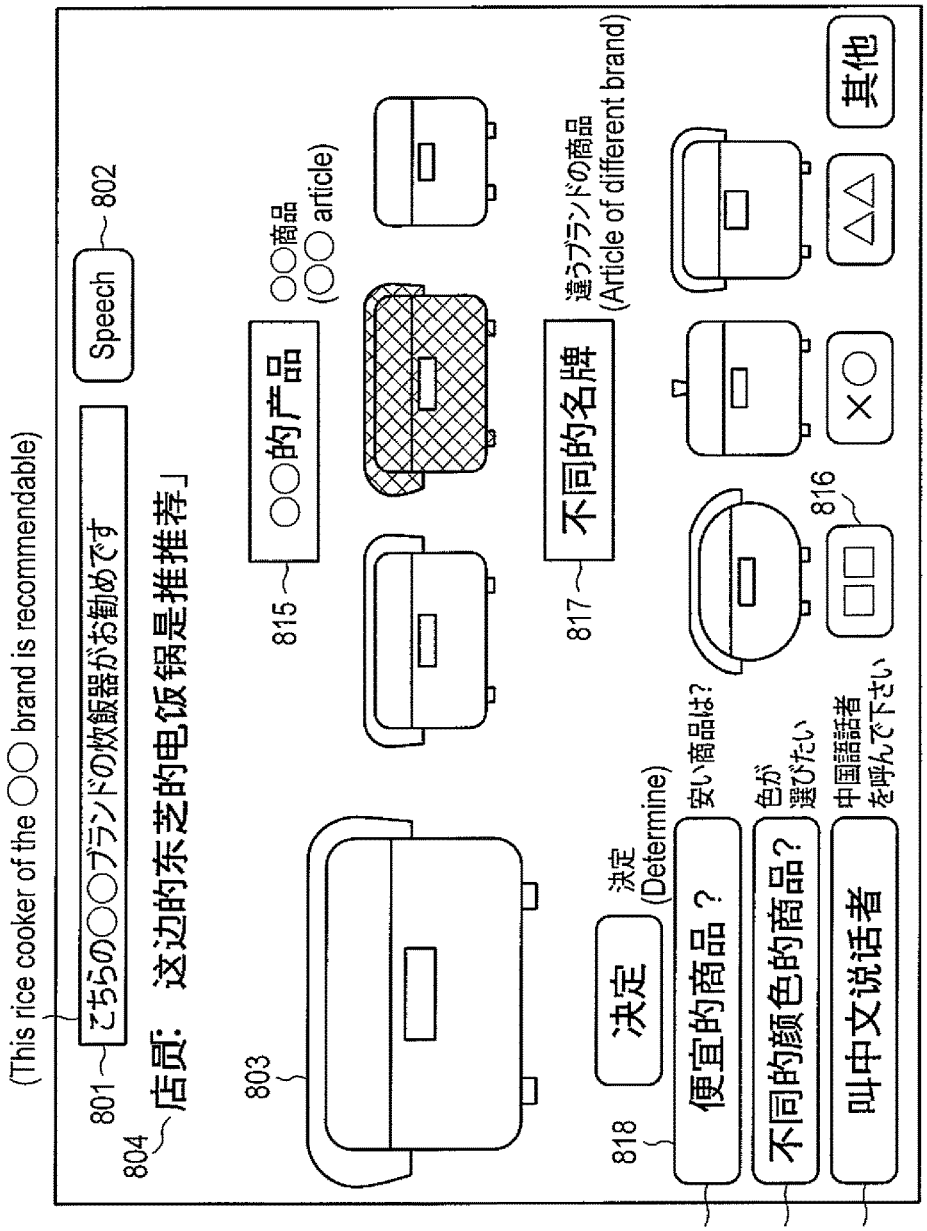
FIG. 18 is a view illustrating another display example of the information presenting screen, displaying the article C, then article associated therewith and the candidate for the subsequent speech.

In FIG. 18, reference number 815 denotes a box for presenting another article of the same brand, reference number 817 denotes a box for presenting an article of a different brand, and reference number 816 denotes a box for presenting each brand name. Further, reference number 818 denotes a box for presenting a subsequent speech candidate.

The subsequent processes, such as the way of display of an associated article, are similar to those in the first embodiment.

Third Embodiment

Figure 19:
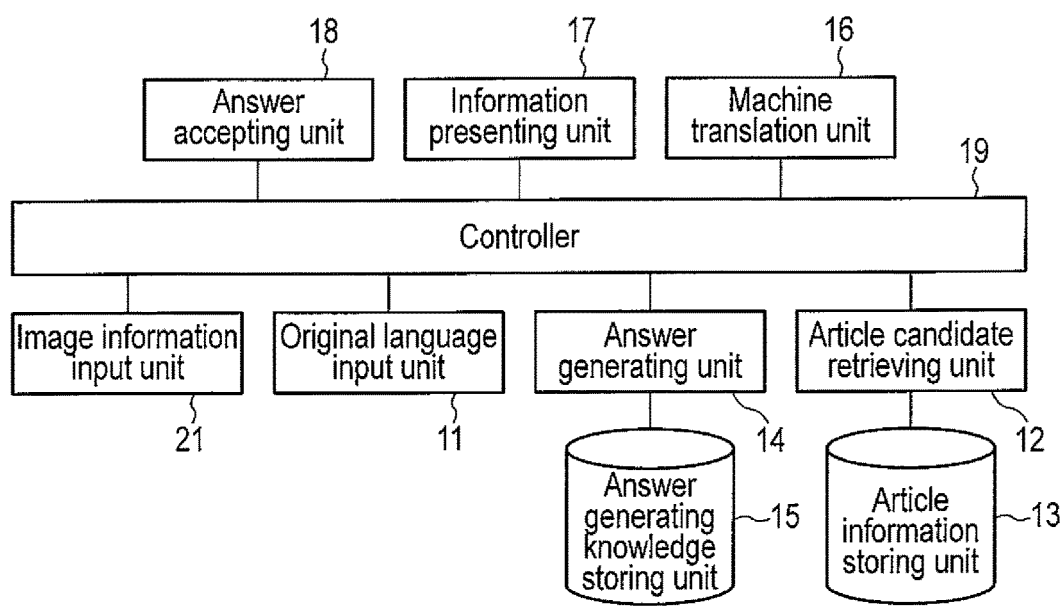
FIG. 19 is a block diagram illustrating a functional configuration example of a service assisting apparatus according to a third embodiment.
Figure 20:
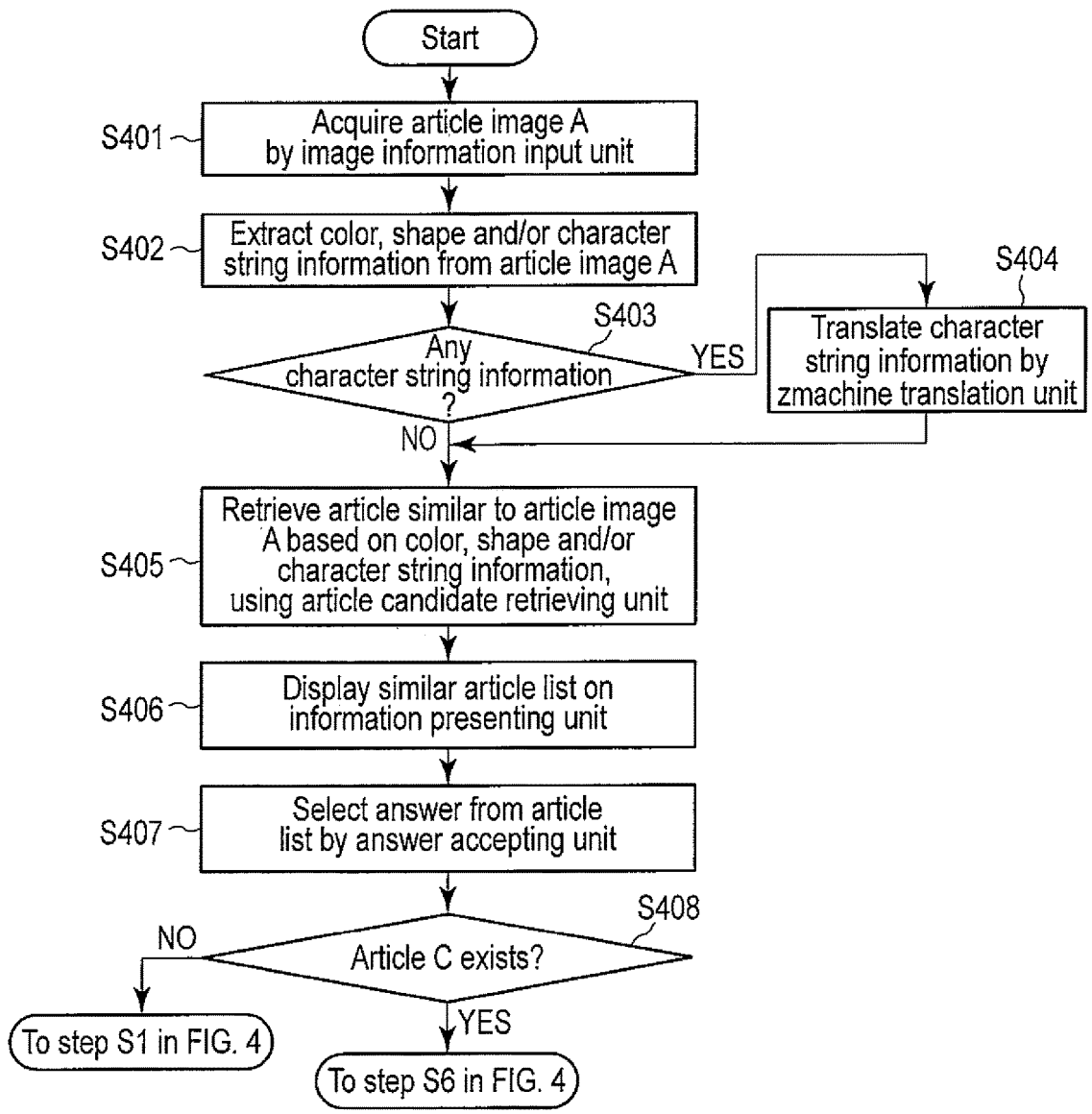
FIG. 20 is a flowchart illustrating a procedure example of the service assisting apparatus according to the third embodiment.

Referring now to FIGS. 19 and 20, a description will be given of a third embodiment, mainly of the portions thereof different from the first embodiment:

The third embodiment differs from the first embodiment in the method of inputting information concerning articles desired by a customer.

FIG. 19 is a block diagram illustrating a functional example of a service assisting apparatus according to the third embodiment. This example is obtained by adding an image information input unit 21 to the example of the first embodiment (FIG. 1).

The image information input unit 21 extracts image information and/or character string information from, for example, an article catalog brought by a customer, thereby starting a dialog with the customer. For instance, image features, such as color and shape, and character string information in the image, are acquired.

The third embodiment differs from the other embodiments in that the former employs the image information input unit 21.

FIG. 20 is a flowchart useful in explaining the process procedure of the service assisting apparatus according to the third embodiment.

At step S401, the image information input unit 21 acquires an article image A from the catalog brought by the customer.

At step S402, the image information input unit 21 extracts image information and/or character string information from the acquired article image A. The extraction of character string information is generally performed, utilizing the Optical Character Recognition (OCR) function that is realized by, for example, available packaged software or an application installed in a mobile terminal.

At step S403, it is determined whether character string information is contained in the article image A in the catalog.

If the character string information is contained, the machine translation unit 16 translates it into information of the first language at step S404 (it is assumed here that the catalog brought by the customer is written in the second language).

For instance, it is assumed that the article image A contains the following word written in the second language: "东○"

In this case, "东○" (second language or Chinese) is translated into "東○" (first language or Japanese). Assume that both words "东○" and "東○" indicate the same brand name. Further, both words "东" and "東" mean "East."

At step S405, a group of articles similar to the article image A are acquired from the article information storing unit 13, using the image feature information, such as color and/or shape, acquired at step S402, and the character string information written in the first language and acquired at step S404.

At step S406, the information presenting unit 17 displays a list of the acquired group of articles on its display screen.

At step S407, the answer accepting unit 18 accepts an article C in the catalog selected by the customer from the article list.

At step S408, if no desired article C exists in the article list, the process returns to step S1, while if the desired article C exists, the process proceeds to step S6.

The process after that is similar to that of the first embodiment.

The instructions included in the procedures in the above-described embodiments can be executed based on a program as software. Further, the same advantage as obtained by the foreign language service assisting apparatuses of the embodiments can also be obtained by beforehand storing the program in a versatile computing system and reading it. The instructions described in the above-described embodiments are recorded, as a program for causing a computer to execute them, on a recording medium, such as a magnetic disk (a flexible disk, a hard disk, etc.), an optical disk (a CD-ROM, a CD-R, a CD-RW, a DVD-ROM, a DVD±R, a DVD±RW, etc.), a semiconductor memory, or a recording medium similar to them. The recording scheme employed in the recording mediums is not limited. It is sufficient if the computer or a built-in system can read the same. If the CPU of the computer reads the program from the recording medium and executes the instructions written in the program, the same function as in the foreign language assisting apparatuses of the embodiments can be realized. It is a matter of course that the computer acquires the program via a network.

Further, the OS (operating system) operating on the computer, database management software, middleware such as a network, etc., may execute part of each process for realizing the embodiments, based on the instructions in the program installed from a recording medium into the computer or the built-in system.

Yet further, the recording medium in the embodiments is not limited to a medium separate from the computer or the built-in system, but may be a recording medium into which a program acquired via a LAN, the Internet, etc., is stored or temporarily stored.

In addition, a plurality of mediums, from which programs are read to execute the process steps of the embodiments, may be employed.

The computer or the built-in system in the embodiments are used to execute each process step in the embodiments based on the program stored in the recording medium, and may be a personal computer or a microcomputer, or be a system including a plurality of apparatuses connected via a network.

The computer in the embodiments is not limited to the above-mentioned personal computer, but may be an operational processing apparatus incorporated in an information processing system, a microcomputer, etc. Namely, the computer is a generic name of a machine or an apparatus that can realize the functions of the embodiments by a program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A foreign language service assisting apparatus for assisting conversations held for services between a first user using a first language and a second user using a second language, comprising a processor programmed to:
    acquire first information, via a first acquisition unit controlled by a controller, on a first article serving as an initial candidate for a certain article, the first information including a first part of a sentence inputted by a microphone having a speech recognition function in the first language, and the first article being associated with at least one article attribute of the certain article;
    acquire second information, via a second acquisition unit controlled by the controller, on at least one second article associated with the first article as a subsequent candidate for the certain article, and to acquire one or more subsequent speech candidates expected to be subsequently spoken by the second user, based on the first information and the at least one article attribute of the first article, each of the second information and the one or more subsequent speech candidates including a second part of the sentence in the first language;
    translate, via a translation unit controlled by the controller, into the second language, parts included in the first information, the second information, and the one or more subsequent speech candidates;
    present, via a presentation unit in communication with the controller, at least the translated parts; and
    accept, via an accepting unit in communication with the controller, a selection associated with the first article, a selection associated with the second article, or a selection associated with the one or more subsequent speech candidates,
    wherein the information on the article attribute is a particular attribute category,
    wherein the second acquisition unit acquires the second information from an article information storing unit that stores a plurality of article information entries including attribute information corresponding to preset plural kinds of attribute categories, based on attribute information corresponding to an attribute category associated with an article name of the first article, and particular attribute information corresponding to the particular attribute category, and wherein the second acquisition unit acquires, as the second information, at least one of part or all of first article information entries and part or all of second article information entries from the article information entries stored in the article information storing unit,
    wherein the first article information entries includes same attribute information as the attribute information corresponding to the attribute category associated with the article name of the first article, and also includes attribute information different from the particular attribute information corresponding to the particular attribute category indicating a color different from a particular color corresponding to the attribute category associated with color,
    wherein the second article information entries includes same attribute information as the attribute information corresponding to the attribute category associated with the article name of the first article, also includes same attribute information as the particular attribute information corresponding to the particular attribute category, and attribute information indicating a same color as the particular color, and excluding third article information entries associated with the first article, and
    wherein the particular attribute category is an attribute category associated with color, and the particular attribute information is information indicating the particular color.

2. The apparatus according to claim 1, further comprising an original language input unit configured to input an original language as the first language, wherein the second acquisition unit acquires, from an article information storing unit storing information associated with a plurality of articles, article information associated with at least one article that satisfies at least one condition set based on original data expressed in the first language and input by the original language input unit, presents a list of the article information, and sets, as the first article, an article selected from the presented list by the first or second user.

3. The apparatus according to claim 1, further comprising a designating unit configured to designate a kind of article, wherein the first acquisition unit presents a list of articles beforehand generated for the designated kind, and sets, as the first article, an article selected from the presented list by the first or second user.

4. The apparatus according to claim 1, further comprising an image information input unit configured to input image information, wherein the second acquisition unit acquires, from an article information storing unit storing information associated with a plurality of articles, article information associated with at least one article that satisfies at least one condition set based on the image information input by the image information input unit, presents a list of the article information, and sets, as the first article, an article selected from the presented list by the first or second user.

5. The apparatus according to claim 1, further comprising an original language input unit configured to input data of an original language, the original language being the first language, wherein the information on the article attribute is designated based on the data of the original language input by the original language input unit.

6. The apparatus according to claim 1, wherein
the information on the article attribute is a particular attribute category;
the second acquisition unit acquires one or more subsequent speech candidates corresponding to the particular attribute category and a frequency of each of the one or more subsequent speech candidates from a subsequent speech candidate storing unit that stores a plurality of subsequent speech candidate entries including respective attribute categories, respective subsequent speech candidates, and respective frequencies at which the subsequent speech candidate entries are selected via the accepting unit; and
the presentation unit presents the acquired one or more subsequent speech candidates based on the acquired frequencies.

7. The apparatus according to claim 6, wherein when the one or more subsequent speech candidates presented by the presentation unit are selected via the accepting unit, the frequencies of the one or more subsequent speech candidates stored in the subsequent speech candidate storing unit are updated.

8. The apparatus according to claim 1, further comprising:
an article information storing unit having a database of articles, wherein the second information is acquired from the database of articles.

9. The apparatus according to claim 8, wherein the second information includes attributes of the at least one second article.

10. A foreign language service assisting method for assisting conversations held for services between a first user using a first language and a second user using a second language, comprising:
acquiring, executed by a processor, via a first acquisition unit controlled by a controller, first information on a first article serving as an initial candidate for a certain article, the first information including a first part of a sentence inputted by a microphone having a speech recognition function in the first language, and the first article being associated with at least one article attribute of the certain article;
acquiring, executed by the processor, via a second acquisition unit controlled by the controller, second information on at least one second article associated with the first article as a subsequent candidate for the certain article, and to acquire one or more subsequent speech candidates expected to be subsequently spoken by the second user, based on the first information and the at least one article attribute of the first article, each of the second information and the one or more subsequent speech candidates including a second part of a sentence in the first language;
translating, executed by the processor, via a translation unit controlled by the controller, into the second language, parts included in the first information, the second information, and the one or more subsequent speech candidates;
presenting, executed by the processor, via a presentation unit in communication with the controller, at least the translated parts; and
accepting, executed by the processor, via an accepting unit in communication with the controller, a selection associated with the first article, a selection associated with the second article, or a selection associated with the one or more subsequent speech candidates,
wherein the information on the article attribute is a particular attribute category,
wherein the second acquisition unit acquires the second information from an article information storing unit that stores a plurality of article information entries including attribute information corresponding to preset plural kinds of attribute categories, based on attribute information corresponding to an attribute category associated with an article name of the first article, and particular attribute information corresponding to the particular attribute category, and wherein the second acquisition unit acquires, as the second information, at least one of part or all of first article information entries and part or all of second article information entries from the article information entries stored in the article information storing unit,
wherein the first article information entries includes same attribute information as the attribute information corresponding to the attribute category associated with the article name of the first article, and also includes attribute information different from the particular attribute information corresponding to the particular attribute category indicating a color different from a particular color corresponding to the attribute category associated with color,
wherein the second article information entries includes same attribute information as the attribute information corresponding to the attribute category associated with the article name of the first article, also includes same attribute information as the particular attribute information corresponding to the particular attribute category, and attribute information indicating a same color as the particular color, and excluding third article information entries associated with the first article, and
wherein the particular attribute category is an attribute category associated with color, and the particular attribute information is information indicating the particular color.

11. The method according to claim 10, wherein the second information is acquired from an article information storing unit having a database of articles.

12. The method according to claim 11, wherein the second information includes attributes of the at least one second article.

13. A non-transitory computer readable medium including computer executable instructions, wherein the instructions, when executed by a computer, cause the computer to perform a method for assisting conversations held for services between a first user using a first language and a second user using a second language, the method comprising:
acquiring first information on a first article serving as an initial candidate for a certain article, the first information including a first part of a sentence inputted by a microphone having a speech recognition function in the first language, and the first article being associated with at least one article attribute of the certain article;
acquiring second information on at least one second article associated with the first article as a subsequent candidate for the certain article, and one or more subsequent speech candidates expected to be subsequently spoken by the second user, based on the first information and the at least one article attribute of the first article, each of the second information and the one or more subsequent speech candidates including a second part of a sentence in the first language;

translating, into the second language, parts included in the first information, the second information, and the one or more subsequent speech candidates;

presenting at least the translated parts; and accepting a selection associated with the first article, a selection associated with the second article, or a selection associated with the subsequent speech candidates, wherein the information on the article attribute is a particular attribute category, wherein the second acquisition unit acquires the second information from an article information storing unit that stores a plurality of article information entries including attribute information corresponding to preset plural kinds of attribute categories, based on attribute information corresponding to an attribute category associated with an article name of the first article, and particular attribute information corresponding to the particular attribute category, and wherein the second acquisition unit acquires, as the second information, at least one of part or all of first article information entries and part or all of second article information entries from the article information entries stored in the article information storing unit, wherein the first article information entries includes same attribute information as the attribute information corresponding to the attribute category associated with the article name of the first article, and also includes attribute information different from the particular attribute information corresponding to the particular attribute category indicating a color different from a particular color corresponding to the attribute category associated with color, wherein the second article information entries includes same attribute information as the attribute information corresponding to the attribute category associated with the article name of the first article, also includes same attribute information as the particular attribute information corresponding to the particular attribute category, and attribute information indicating a same color as the particular color, and excluding third article information entries associated with the first article, and wherein the particular attribute category is an attribute category associated with color, and the particular attribute information is information indicating the particular color.

14. The non-transitory computer readable medium according to claim 13, wherein the second information is acquired from an article information storing unit having a database of articles.

15. The non-transitory computer readable medium according to claim 14, wherein the second information includes attributes of the at least one second article.

* * * * *